(12) United States Patent
Cura et al.

(10) Patent No.: US 6,855,079 B2
(45) Date of Patent: Feb. 15, 2005

(54) BI-DIRECTIONAL BELT TENSIONER

(75) Inventors: Carl A. Cura, Wilmington, NC (US); William McCotter, Wilmington, NC (US)

(73) Assignee: Fenner, Inc., Manheim, PA (US)

( * ) Notice: Subject to any disclaimer, the term of this patent is extended or adjusted under 35 U.S.C. 154(b) by 0 days.

(21) Appl. No.: 10/354,397

(22) Filed: Jan. 30, 2003

(65) Prior Publication Data
US 2004/0063531 A1 Apr. 1, 2004

Related U.S. Application Data

(60) Provisional application No. 60/414,861, filed on Sep. 30, 2002.

(51) Int. Cl.[7] ................................................. F16H 7/12
(52) U.S. Cl. ..................................................... 474/135
(58) Field of Search ................................. 474/132–135

(56) References Cited

U.S. PATENT DOCUMENTS

| | | |
|---|---|---|
| 2,558,311 A | 6/1951 | Morrow |
| 3,091,947 A | 6/1963 | Thomsen |
| 4,253,343 A | 3/1981 | Black et al. |
| 4,285,676 A | 8/1981 | Kraft |
| 4,309,174 A | 1/1982 | Sproul |
| 4,458,403 A | 7/1984 | Foster |
| 4,464,147 A | 8/1984 | Foster |
| 4,466,803 A | 8/1984 | Wilson |
| 4,472,162 A | 9/1984 | Hitchcock |
| 4,473,362 A | 9/1984 | Thomey et al. |
| 4,504,254 A | 3/1985 | Foster |
| 4,525,152 A | 6/1985 | Speer et al. |
| 4,536,172 A | 8/1985 | Burris et al. |
| 4,557,709 A | 12/1985 | St. John |
| 4,661,087 A | 4/1987 | Henderson |
| 4,886,483 A | 12/1989 | Henderson |
| 4,906,222 A | 3/1990 | Henderson |
| 4,957,471 A | 9/1990 | St. John |
| 4,985,010 A | 1/1991 | Henderson |
| 5,015,217 A | 5/1991 | Henderson |
| 5,370,586 A | 12/1994 | Thomsen et al. |
| 5,470,279 A | 11/1995 | Brandenstein et al. |
| 5,496,221 A | 3/1996 | Gardner et al. |
| 5,575,726 A | 11/1996 | Gardner et al. |
| 5,718,649 A | 2/1998 | Hong et al. |
| 5,803,849 A | 9/1998 | Ayukawa |
| 5,918,717 A | 7/1999 | Fohl |
| 5,964,674 A | 10/1999 | Serkh et al. |
| 6,217,471 B1 | 4/2001 | Brandsma et al. |
| 6,231,465 B1 | 5/2001 | Quintus |
| 6,565,468 B2 * | 5/2003 | Serkh .......................... 474/135 |
| 6,575,860 B2 * | 6/2003 | Dutil ........................... 474/135 |

FOREIGN PATENT DOCUMENTS

| | | | | |
|---|---|---|---|---|
| EP | 0 482 382 A1 | * | 4/1992 | ............. F16H/7/12 |
| JP | 63-308259 A | * | 12/1988 | ................. 474/132 |
| JP | 03-163245 A | * | 7/1991 | ................. 474/135 |
| JP | 04-347043 A | * | 12/1992 | ................. 474/135 |
| JP | 06-280950 A | * | 10/1994 | ................. 474/135 |
| JP | 07-103296 A | * | 4/1995 | ............. F16H/7/12 |
| WO | WO 97/07584 A1 | * | 2/1997 | ........... H02K/7/116 |

* cited by examiner

*Primary Examiner*—Marcus Charles
(74) *Attorney, Agent, or Firm*—Stephen H. Eland; Dann, Dorfman, Herrell and Skillman (57) ABSTRACT

An assembly for maintaining tension in a drive belt features a housing mounted on a base. The housing contains a biasing element that exerts torque on the housing to bias the housing in a radial direction. A lever arm is connected to the housing and rotates with the housing in response to the bias of the biasing element. A pulley is connected to the lever arm and engages a drive belt in response to the bias force of the biasing element on the lever arm. The pulley deflects the shape of the belt to provide tension in the belt. In one embodiment, the apparatus allows the user to switch the position of the biasing element and alter the direction of torque on the lever arm. In another embodiment, the lever arm and pulley are removable from the housing and replaceable with other arms and pulleys having different configurations.

19 Claims, 13 Drawing Sheets

BI-DIRECTIONAL BELT TENSIONER

RELATED APPLICATIONS

This application claims priority under 35 U.S.C. §119 to U.S. Provisional Application No. 60/414,861, filed Sep. 30, 2002, which is hereby incorporated herein by reference.

FIELD OF THE INVENTION

The present invention relates generally to belt tensioners, and more specifically to mechanical spring-actuated or biased belt tensioners for use in continuously maintaining tension in endless drive belts in power transmission drive systems.

BACKGROUND OF THE INVENTION

The known belt tensioners are mostly related to designs that are used in maintaining belt tension in serpentine belt drives for automotive applications. While the majority of the known tensioners pertain to automotive application tensioners, there are other industrial applications where machines have drive systems that have motors driving pulleys with endless belts that need to be tensioned. One example of the prior art is shown in U.S. Pat. No. 4,557,709.

The known belt tensioners are constructed of a base part, a lever arm and a spring. The lever arm has a mounting feature onto which a pulley is attached. The pulley rides against the belt that is to be tensioned. The base is mounted on or in proximity to the device containing the drive belt. The base part contains a feature that houses the spring and also fixes one end of the spring from moving. The base typically has a hole axially through its central area and through the center of the spring that receives a pivot feature on the lever arm.

The lever arm has a pivot feature that usually has a shaft with a hole through it. The arm may also have a feature onto which one end of the spring is affixed. On the lever arm at a distance from and parallel to the pivot axis is a feature where a pulley can be attached. The pulley is forced against the belt and the drive system by the torque from the spring.

The spring in the known art is either a torsion spring or a spiral spring. The spring has one end fixed to the base and the other fixed to the arm. As the arm is moved in a radial manner about the pivot, the base is fixed and does not move, so the end of the spring fixed to the base does not move. The spring is compressed by the radial movement of the lever arm, which stores energy in the spring. The stored energy applies a steady force or torque to the arm and the pulley, pressing the pulley into engagement with the belt. The pulley adds tension in the belt by deflecting the shape of the belt. The added tension maintains the belt in a tight arrangement in the drive system.

A bolt is usually placed through the arm and the hole, through the pivot and base and threaded or fixed to the drive system. The bolt keeps the base from moving relative to the drive system. The pivot feature allows the lever arm to move when the bolt is tightened. The base is mounted so that there is some amount of compression in the spring when the belt is mounted against the pulley. As stated earlier, this compression exerts torque on the lever arm to press the pulley into engagement with the belt. The pulley maintains tension in the belt and compensates for changes in the length of the belt. When slack develops in the belt due to belt expansion or stretching, the spring has sufficient stored energy to exert additional torque on the lever arm and press the pulley further into the belt to remove any slack.

SUMMARY OF THE INVENTION

The present invention is an assembly for maintaining tension in a drive belt. The assembly features a housing mounted on a fixed base. The housing contains a biasing element having a first end that engages the housing and a second end that engages the base. The biasing element exerts a torque on the housing to bias the housing in a first rotational direction relative to the base. A lever arm is connected to the housing and rotates with the housing in response to the bias of the biasing element. A pulley is connected to the lever arm and is pressed into engagement with the drive belt in response to the bias on the lever arm. The pulley deflects the shape of the belt to provide tension in the belt.

In one embodiment, the apparatus has a modular construction that provides the user with flexibility to assemble the apparatus in a manner that applies torque in either a clockwise or counterclockwise direction. In another embodiment, the device has a multi-part modular construction that allows lever arms and pulleys having different sizes and shapes to be used with the same housing and base. The lever arm, pulley, or both may be removed from the apparatus and replaced with a different sized lever arm and/or pulley to accommodate a different belt drive system or a different tensioning arrangement. Lever arms and pulleys having very simple configurations may be used with the housing and base. As such, the manufacturing costs for the lever arms and pulleys are reduced in comparison to prior art tensioning apparatuses. The housing portion of the modular arm may be constructed with a pivot feature that incorporates ball bearings. The ball bearings reduce the effects of frictional resistance generated when torque is provided in the tensioning apparatus.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE PREFERRED EMBODIMENT

Figure 1:
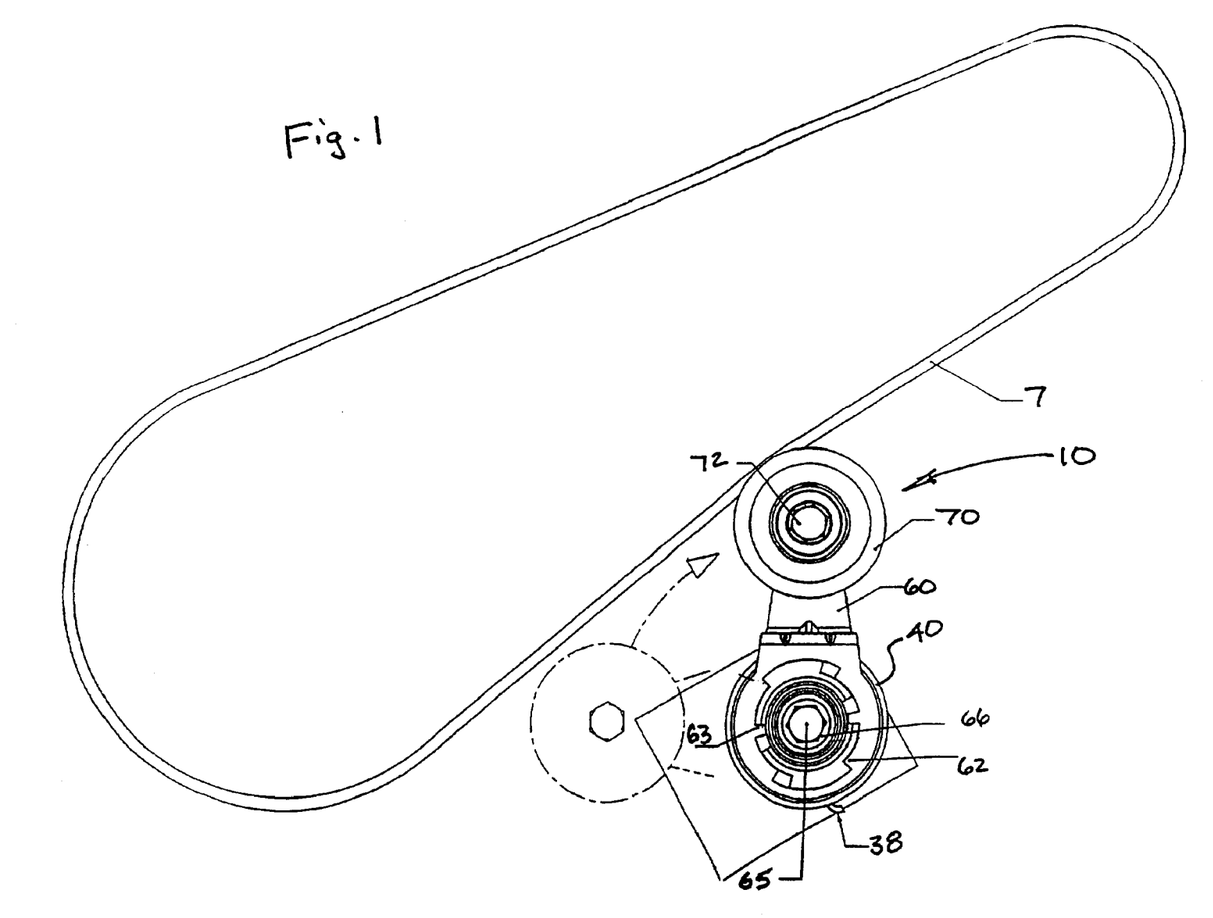
FIG. 1 is a diagram of a typical application, including a belt, tensioner assembly and idler pulley.
Figure 2:
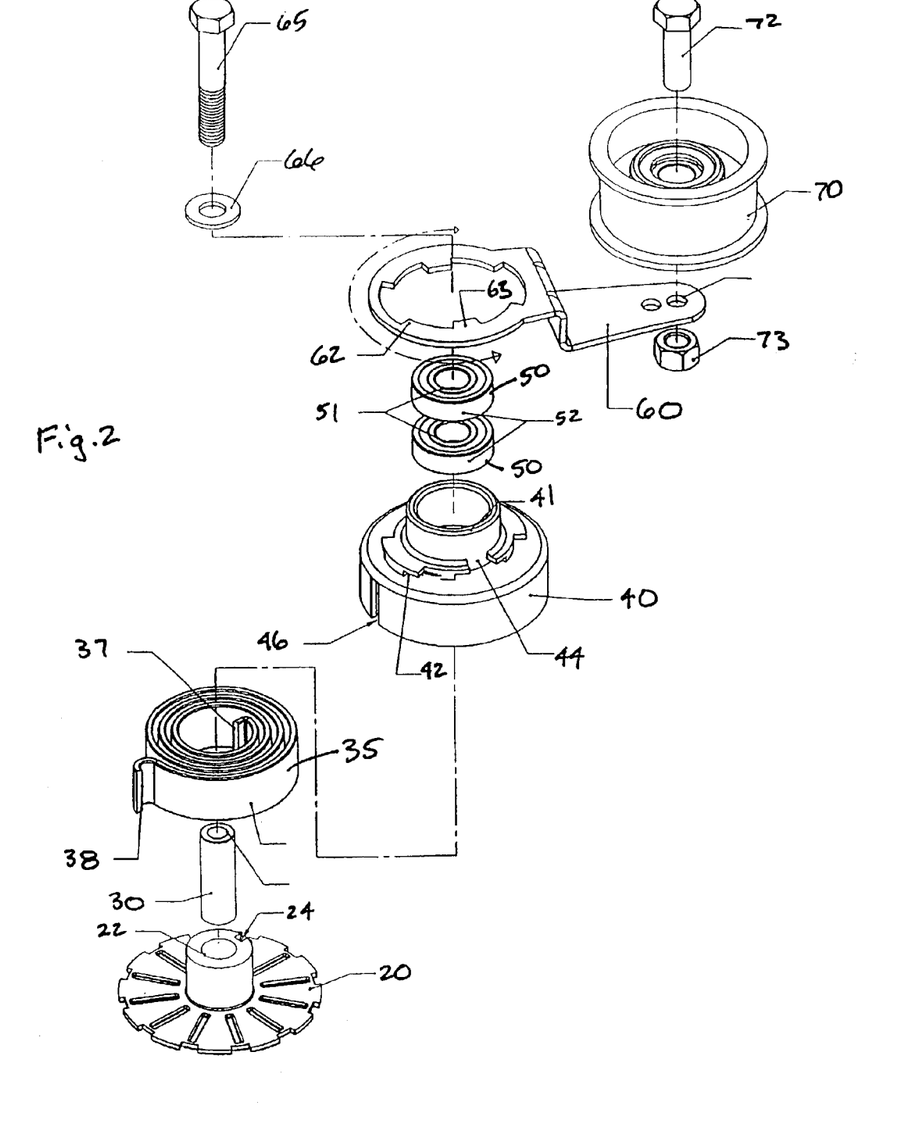
FIG. 2 is an exploded perspective view of the present configuration of the belt tensioner assembly shown with a flat belt idler pulley and mounting hardware.
Figure 3:
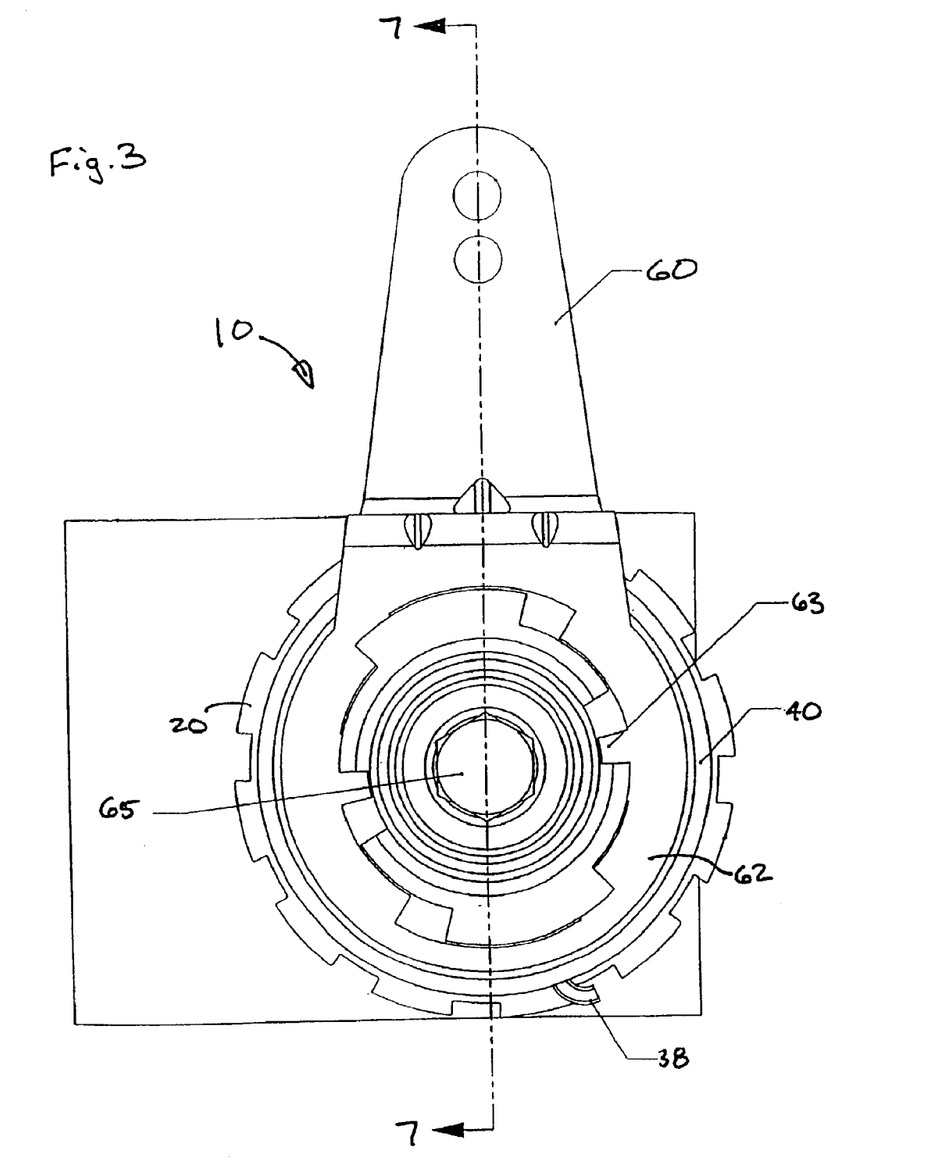
FIG. 3 is a front elevation view of the tensioner without the idler pulley.

Referring now to the drawings in general, and to FIGS. 1 and 2 specifically, a tensioner apparatus is generally designated 10. The tensioner 10 biases an idler pulley 70 into engagement with a belt 7. The tensioner 10 includes a pivotable arm 60 removably attached to a housing 40. The arm 60 is under bias from a biasing element 35 in the housing 40. The pulley 70 is connected to the end of the arm 60 and engages the belt 7 to apply tension to the belt under the bias from the biasing element 35.

The tensioner 10 has a modular construction that allows the housing 40 to be readily assembled with arms 60 and pulleys 70 having a variety of sizes. As such, the tensioner 10 may be provided as an assembly or kit which comprises a biasing element 35, a housing 40, and a variety of lever arms 60 and pulleys 70 having different sizes. Depending on the application, a lever arm 60 and pulley 70 having appropriate dimensions may be selected and connected to the housing 40.

The modular construction of the tensioner 10 permits easy disassembly and access to the biasing element 35. Referring to FIG. 2, the tensioner 10 comprises a torsion spring 35. The spring 35 is readily removable from the housing 40 and can be reinserted in an opposite or reverse configuration to change the direction of the bias exerted on the lever arm 60.

Referring now to FIG. 2, the details of the tensioner will be described in greater detail. The housing 40 is mounted over a base 20. The base includes a central boss or hub 22 projecting upwardly. The hub 22 is generally cylindrical having a central bore and a vertical slot 24 extending along the height of the hub. The central bore of the base 20 is sized to receive a cylindrical shaft 30. The base 20 is preferably injection molded in a fiber reinforced nylon material. Alternatively, the base could be made using other mold types or manufacturing processes.

The shaft 30 is cylindrical, having a central bore that extends through the shaft. The shaft may be made from a steel tubing, or from a machined from a solid piece of metal, such as steel alloy. The bore through the shaft 30 aligns with the bore in the hub 22 to allow the insertion of a mounting bolt 65.

Figure 6:
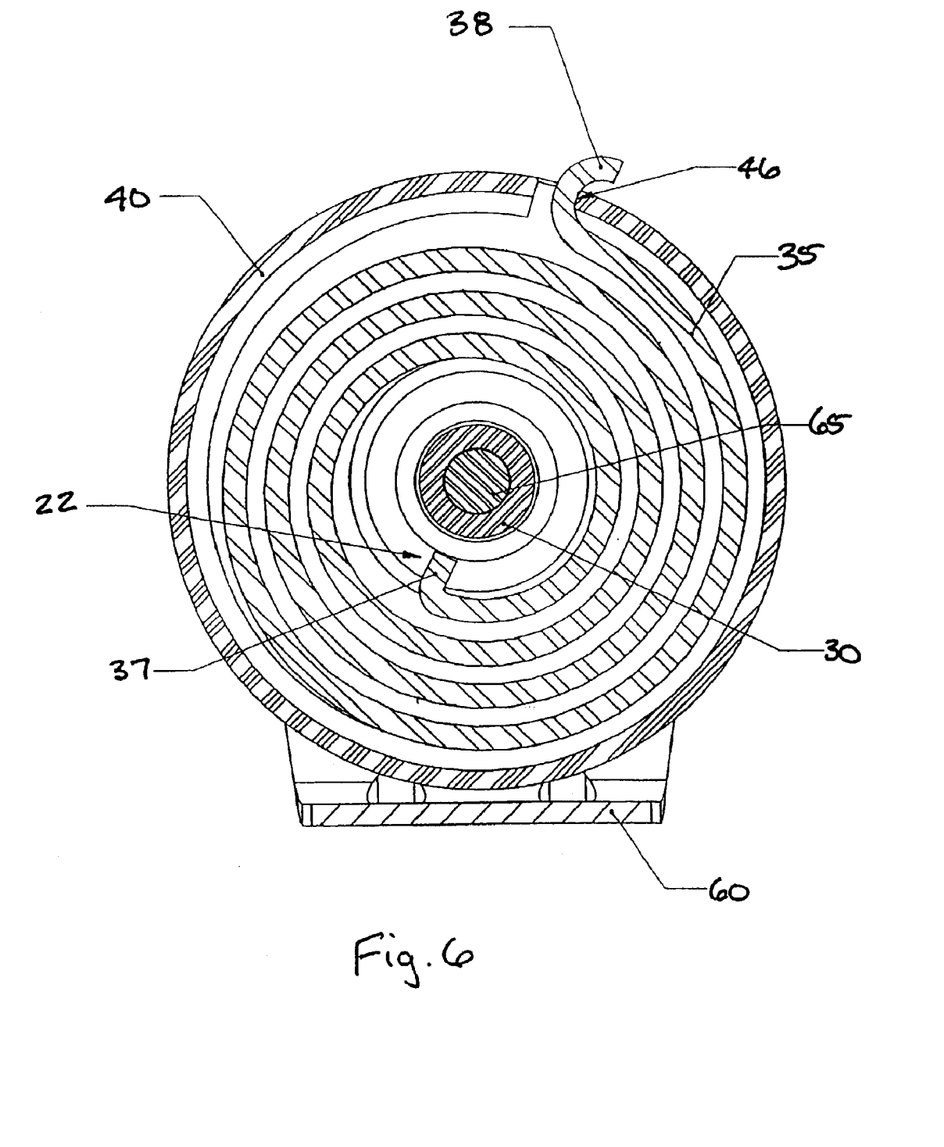
FIG. 6 is a sectional view of the device in FIG. 5 taken along the line 6—6.
Figure 7:
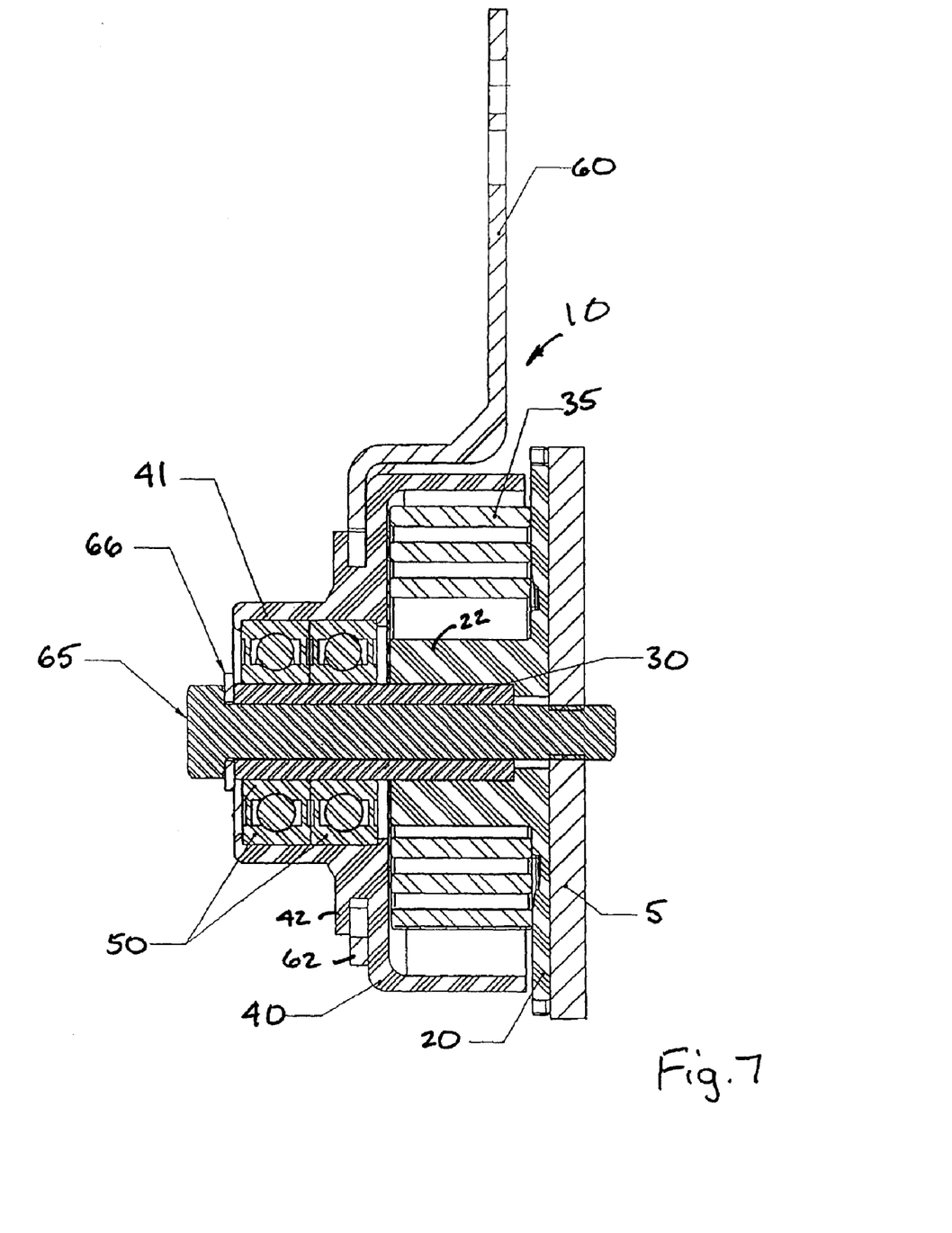
FIG. 7 is a sectional view of the device in FIG. 3 taken along the line 7—7.
Figure 8:
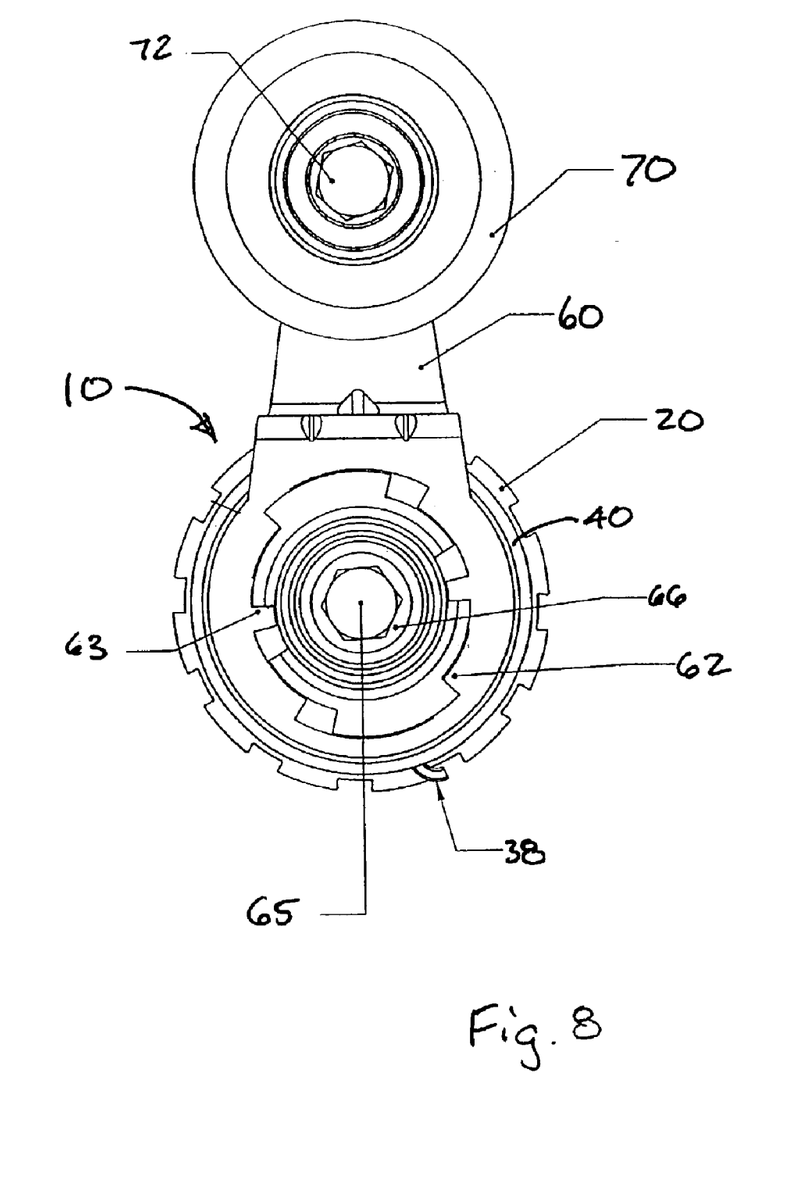
FIG. 8 is a front view of the belt tensioner assembly illustrated in FIG. 2.
Figure 9:
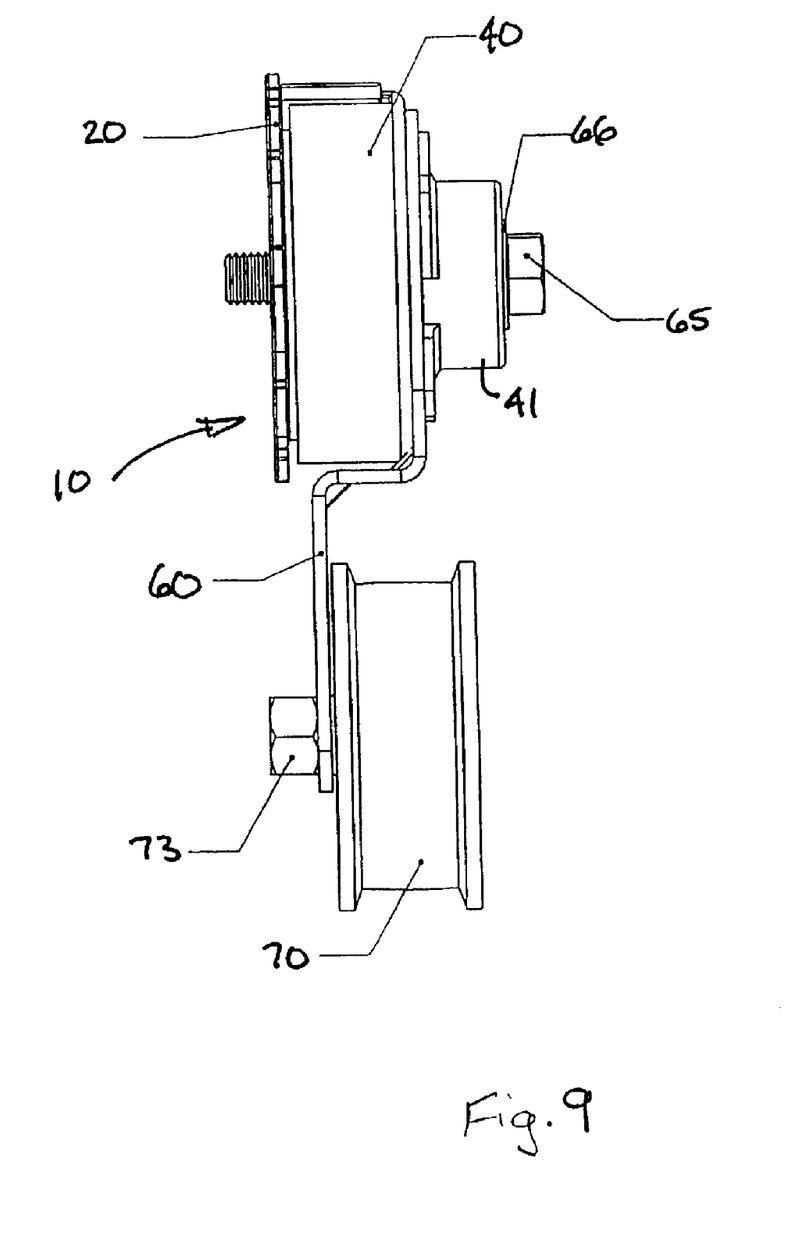
FIG. 9 is a side elevational view of the tensioner assembly shown in FIG. 8.

The spring 35 is a spiral spring formed from a long piece of rectangular steel that is formed in a spiral fashion to create a plurality of overlapping convolutions. The inner end 37 of the spring 35 forms a tongue that is inserted into the slot 24 in the hub 22 of the base 20. The outer end 38 of the spring 35 also forms a tongue, which engages the housing 40 as described further below. The inner convolutions of the spring 35 have a diameter that is larger than the outer diameter of the hub 22 so that the spring is disposed around the hub 22, as shown in FIG. 6.

The housing 40 is also preferably injection molded in a fiber reinforced nylon material, however the base could also be made using other manufacturing processes. The housing 40 is generally cylindrical, preferably having a height that is less than its diameter. A vertical opening or slot 46 is formed in the side of the housing 40 and is configured to receive the outer end 38 of the spring 35. The top of the housing 40 includes a locking flange 42 and a gap 44 configured to cooperate with the arm 60 to releasably attach the arm to the housing, as discussed further below.

The housing 40 includes a central hub 41 having an opening in which one or more bearing assemblies 50 are disposed. The bearings 50 are radial ball bearings that can either be pressed into the central bore of the housing to form an interference fit or alternatively can be insert molded into the central bore during the molded process. The outer race 52 of each bearing is fixed to the central bore of the housing 40. The shaft 30 extends through the bearings 50 so that the inner race 51 of each bearing engages the outer surface of the shaft 30. In this way, the bearings allow the housing 40 to rotate relative to the shaft 30, so that the shaft 30 forms a rotational axis around which the housing rotates.

Figure 4:
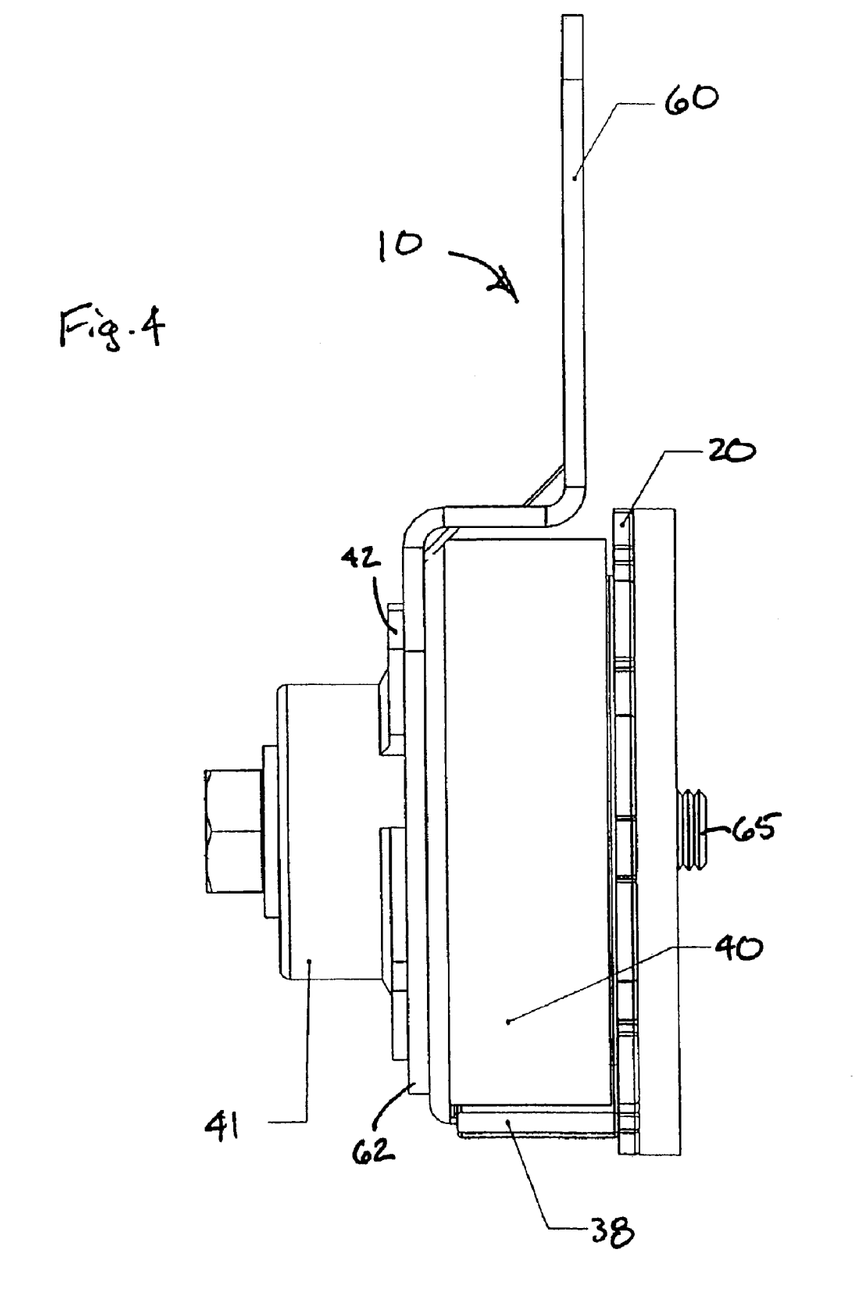
FIG. 4 is a side elevational view of the tensioner device shown in FIG. 3.
Figure 5:
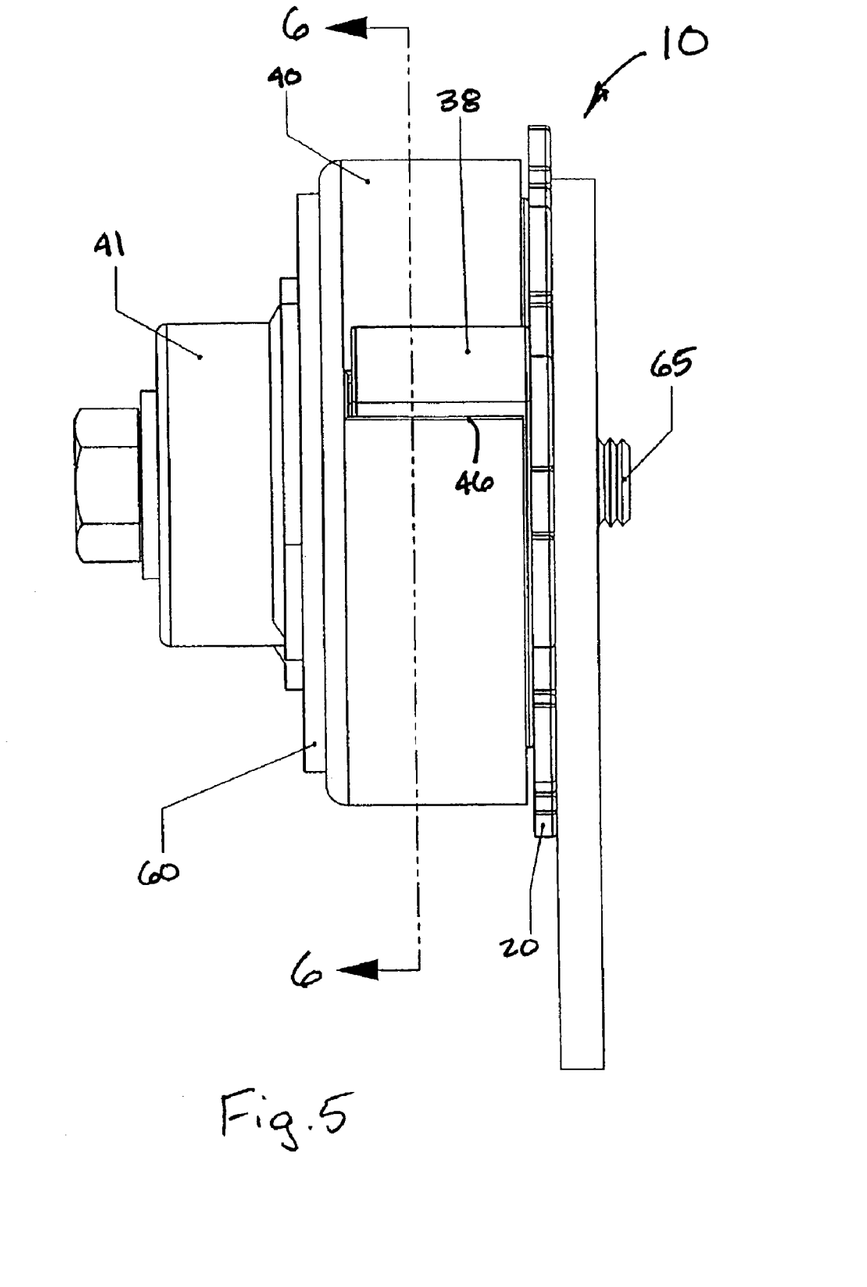
FIG. 5 is a bottom elevational view of the tensioner device shown in FIG. 3.

The housing 40 along with the bearings 50 are assembled onto the base 20 by inserting the shaft 30 through the inner race 51 of each bearing 50 while also aligning the slot 46 in the housing with the outer end 38 of the spring 35. The mounting bolt 65 and washer 66 are used to attach the housing 40 to the base. The bolt 65 extends through the bearings 50, the sleeve 30 and the base 20, and into the frame 7 of the device to which the tensioner is mounted. The head of the bolt 65 presses the washer 66 against the end of the shaft 30. In this way, the housing 40 is mounted over the base 20 and the spring 35 so that the housing is rotatable relative to the base. Referring to FIG. 4, the lower edge of the housing 40 is preferably spaced apart from the top surface of the base 20 so that a gap is formed between the housing and the base. The gap allows the housing to readily rotate relative to the base without frictional resistance and consequent wear. Rotating the house in a first direction increases the bias in the spring biasing the housing in a second direction that is reverse the first direction. The bias of the spring can be reversed by flipping over the spring in the housing.

Figure 10:
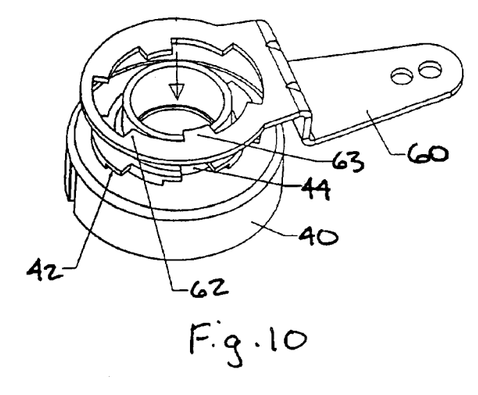
FIG. 10 is a detail showing the housing portion of the design along with the arm. It is the first in a sequence of FIGURES showing the "Bayonet" type of method that connects the arm to the housing. This particular detail shows the arm and the housing in an exploded view, with the tab sections on the arm aligned with the notch sections on the housing. The arrow shows that once the tabs are aligned with the slots, the arm can then be moved down, flush with the housing.
Figure 11:
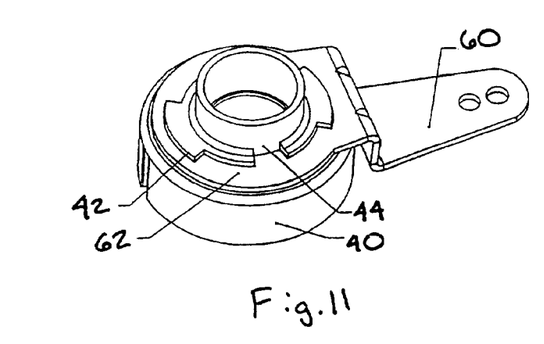
FIG. 11 is the next in the arm/housing assembly sequence, showing the arm with the tabs aligned with the slots in the housing, and with the bottom surface of the arm in contact with the top surface of the housing.
Figure 12:
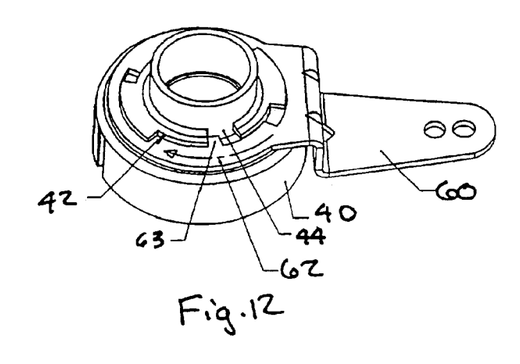
FIG. 12 is the last in the sequence of the arm/housing assembly sequence, showing the arm rotated in a clockwise direction relative to the housing, and the tabs on the arm engaged into the slots in the housing. This sequence can also be achieved in a counter clockwise manner, since the features are mirrored on both sides of the parts.

The arm 60 is releasably connected to the housing 40. In this way, different arms of different length and configurations can be attached to the housing. The arm 60 is attached to the housing 40 by means of a bayonet-type connection. Specifically, the arm 60 includes a locking collar 62 that includes a locking tab 63 that cooperates with the locking flange 42 on the housing. The locking tab 63 on the arm is aligned with an opening or gap 44 in the locking flange 42 on the housing and is moved down through the gap and rotated either clockwise or counterclockwise, depending on which way the biasing force is to be applied by the tensioner 10. When the arm is rotated, it slides under a ledge below the flange that retains the locking tabs 63 of the locking collar on the arm. In this way, the locking collar 62 and the locking flange 42 cooperate to retain the arm to impede axial displacement of the arm relative to the housing. Preferably, the mounting configurations on the arm and housing are mirrored. This adds flexibility to connecting the arm and base, with less concern for how the gap 44 is oriented relative to the desired position of the arm 60.

An elongated portion of the arm 60 extends away from the locking collar, and includes a plurality of holes for mounting an idler pulley 70 to the arm. Specifically, the tensioner arm 60 includes one or more holes so that a bolt 72 can pass through the idler pulley 70 and the arm to attach the idler pulley to the arm with a nut 73.

The tensioner assembly 10 may be attached to the frame of a device or onto a mounting assembly attached to a device. Referring to FIG. 1, the tensioner assembly 10 is assembled so as to engage the belt in the position shown ("engaging position"). Before the belt 7 is assembled, the tensioner assembly 10 would typically be assembled with the arm 60 pivoted into a position rotated approximately 90 degrees from the engaging position (such as that shown in phantom lines). This position ("relaxed position") would not have any biasing load generated by the spring 35 because there would be no deflection in the spring.

When the belt is assembled, the tensioner arm 60 is rotated to the engaging position. During rotation of the arm 60, the housing 40 rotates in a radial direction around the pivot axis. By rotating the housing 40, the outer end 38 of the spring 35 moves in a radial direction because of its connection with the slot 46 in the housing 40. The inner end 37 of the spring remains fixed in contact with the slot 24 in the base 20 while the outer end 38 moves radially. As a result, movement of the outer end 38 of the spring 35 relative to the inner end 37 causes deflection in the spring. The deflection in the spring 35 generates a load which is resisted by a bias force exerted by the spring. In general, the bias force in the spring is proportional to the amount of deflection caused by rotation. The bias force is transferred through the lever arm 60 to the idler pulley 70 at the end of the arm. The idler pulley 70, in turn, pushes on the belt 7 and deflects the shape of the belt. The deflection of the belt form tension and removes the slack in the belt. The biasing force on the arm 60 also causes the bayonet-type attachment of the arm to the housing 40 to remain in engagement.

Figure 13:
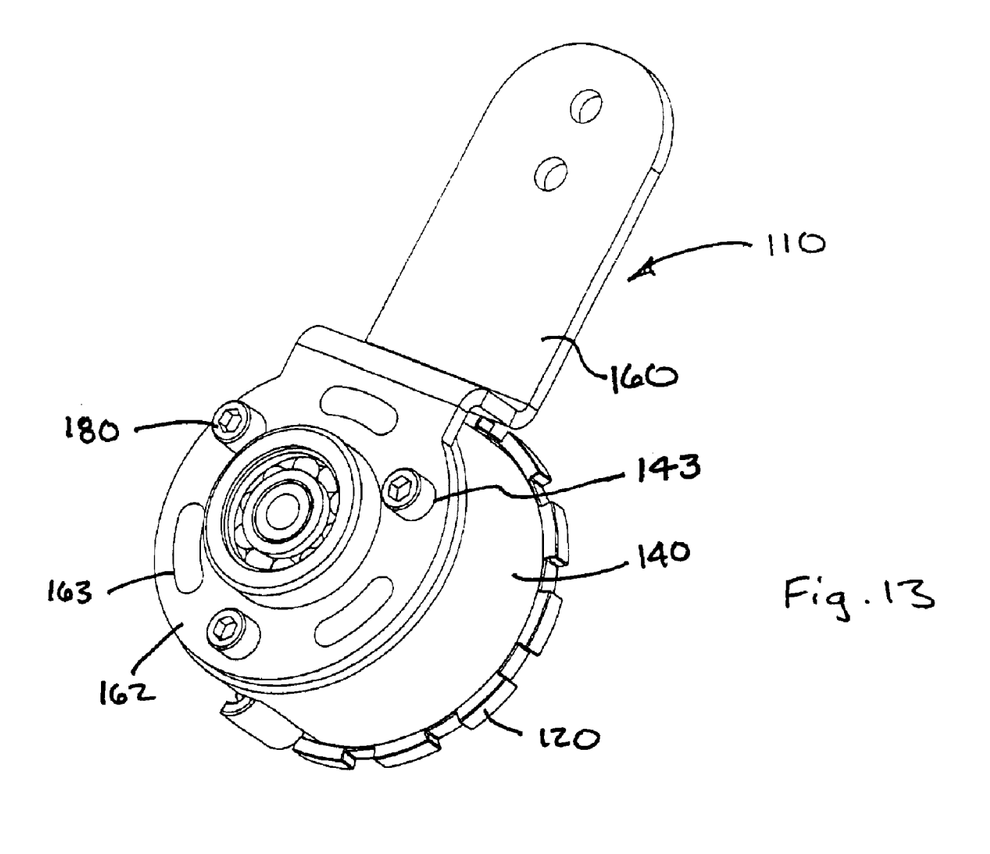
FIG. 13 is a perspective view of an alternative embodiment of a tensioner.
Figure 14:
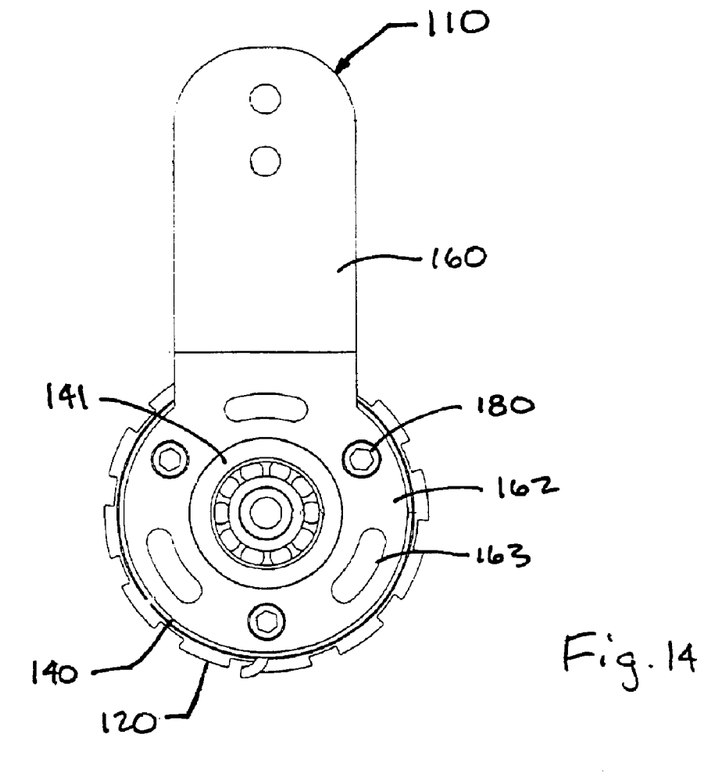
FIG. 14 is a plan view of the tensioner illustrated in FIG. 13.
Figure 15:
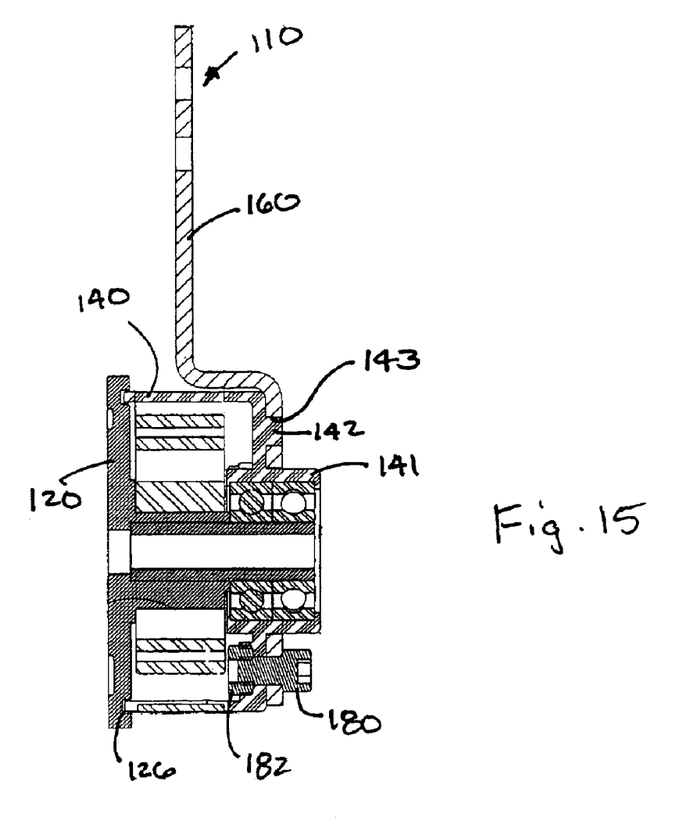
FIG. 15 is a sectional view of the tensioner illustrated in FIG. 13.

Referring now to FIGS. 13–15, an alternative embodiment of the tensioner is designated generally 110. The tensioner 110 is similar to the embodiment discussed above, and illustrates an alternative and preferred connection between the arm and the tensioner housing. Specifically, the tensioner 110 includes a plurality of fasteners, such as nuts 182 and bolts 180 that attach the arm 16 to the housing 140.

The tensioner 110 includes a base 120 that is similar to the base 20 in the first embodiment previously described. However, preferably, the base 110 includes a circular groove 126 that extends around the periphery of the top surface of the base, as shown in FIG. 15. The groove 126 is configured to receive the lower edge of the housing 140. Preferably, the groove 126 is wider than the thickness of the housing so that the housing can rotate in the groove as the housing is turned relative to the base. In this way, there is a gap between the lower edge of the housing and the bottom of the groove so that the housing can readily pivot relative to the base, but there is not an exposed gap that would allow dirt, dust and other contaminants to easily enter the housing.

The housing 140 is similar to the housing of the first embodiment, except that the housing includes a plurality of pins 142 and holes 143 for aligning and attaching the housing with the arm 160, rather than the locking flange 42 used in the first embodiment. Specifically, the upper surface of the housing 140 includes a plurality of pins 142 projecting upwardly, circumferentially spaced apart around a central hub 141. In addition, the upper surface of the housing includes a plurality of holes 143 circumferentially spaced apart around the central hub.

The arm 160 comprises a locking bracket 162 that includes a plurality of radial slots 163 circumferentially spaced apart. The slots are sized and configured to cooperate with the pins 142 on the top of the housing to align the arm 160 on the housing. In addition, the locking bracket includes a plurality of circumferentially spaced apart holes 164. The locking bracket also includes a central aperture configured to fit over the central hub 141 of the housing.

To attach the arm 160 to the housing 140, the mounting bracket 162 of the arm is placed onto the housing so that the pins 142 on the housing project into the radial slots 163 in the arm, and the holes 164 in the arm are aligned with the holes 143 on the top of the housing. The bolts 180 are then inserted through the aligned holes and threaded into the nuts 182 to attach the arm 160 to the housing 140. The nuts 182 may be inserted into recesses formed inside the housing so that the nuts are attached to the housing. Alternatively, rather than using separate nuts, the holes 143 in the housing can be threaded so that the bolts can be threaded directly into the housing to attach the arm to the housing. In this way, a variety of arms 160 of different lengths and configurations can be used with the same housing and base so that the tensioner can be used in a variety of applications.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

We claim:

1. A tensioner for tensioning a drive belt, comprising:
   a housing having a generally open lower end;
   a base closing the open lower end of the housing;
   a first connector on either the housing or the base;
   a shaft disposed within the housing, projecting upwardly from the base and fixedly attached to the base;
   an arm formed separately from the base and the housing, having first and second ends with a second connector on the first end that is cooperable with the first connector to attach the arm to the first connector;
   a bearing disposed within the housing and connected with the shaft and the housing so that the housing is rotatable relative to the base about the shaft;
   a fastener detachably connecting the housing to the base; and
   a reversible biasing element disposed within the housing and providing a torque to bias the housing relative to the base, wherein when the biasing element is disposed in a first orientation, the biasing element is operable to bias the housing in a clockwise direction relative to the base, and when the biasing element is reversed into a second orientation, the biasing element is operable to bias the housing in a counter-clockwise direction relative to the base.

2. The assembly of claim 1 wherein the biasing element comprises a wound torsion spring having a plurality of convolutions.

3. The tensioner of claim 1 wherein the biasing element has a first end releasably connected with the housing and a second end releasably connected with the base.

4. The tensioner of claim 1 wherein the housing has a lower edge confronting the base and the housing is spaced apart from the base to create a gap between the base and the housing.

5. The tensioner of claim 1 wherein the bearing is molded into the housing to fixedly attach the bearing to the housing.

6. The tensioner of claim 1 wherein the base comprises a hub forming a socket configured to receive the shaft.

7. The tensioner of claim 1 wherein the bearing has an outer race fixedly attached to the housing and an inner race fixedly attached to the shaft.

8. The tensioner of claim 1 wherein the housing has a generally closed upper end and the first connector is on the upper end so that the arm can be attached to or detached from the housing without removing the housing from the base.

9. The tensioner of claim 1 wherein the first connector is on the housing and is positioned and configured to allow the arm to be attached to or detached from the housing without removing the housing from the base.

10. The tensioner of claim 1 wherein the shaft is connected to the base, and the fastener is operable to detach the housing from the base while the shaft remains connected to the housing.

11. A method for tensioning a belt, comprising the steps of:
providing a base having a shaft;
attaching a torsional biasing element to the base;
providing a housing having an attached bearing;
attaching the housing to the base and the spring so that the housing encloses the biasing element and the biasing element is operable to provide a torsional force in a first direction to bias the housing relative to the base;
attaching an arm to the housing;
detaching the housing from the base;
reversing the biasing element after the housing is detached from the base;
re-attaching the housing to the base after reversing the biasing element;
attaching a pulley to the arm;
rotating the housing in a first direction relative to the base so that the biasing element provides a torsional force biasing element in a direction opposite the first direction; and
moving the pulley into contact with a belt after rotating the housing relative to the base so that the torsional force tensions the belt.

12. The method of claim 11 wherein the step of attaching the housing to the base comprises attaching the housing to the base so that a gap is formed between the base and the housing.

13. The method of claim 11 comprising the step of molding the bearing into the housing.

14. The method of claim 11 wherein the step of attaching the housing to the base comprises also attaching the base to a machine.

15. The method of claim 11 comprising the step of detaching the arm from the housing without removing the housing from the base.

16. The method of claim 11 wherein the step of detaching the housing from the base comprises the step of detaching the housing while the shaft remains connected to the base.

17. A tensioner for tensioning a drive belt, comprising:
a housing having a generally open lower end;
a base closing the open lower end of the housing;
a shaft disposed within the housing, projecting upwardly from the base and fixedly attached to the base;
an arm formed separately from the housing and the base, and connectable with either the housing or the base, wherein the arm comprises a first end configured for connecting the arm to the housing or the base and a second end configured for mounting a machine element;
a bearing disposed within the housing and connected with the shaft and the housing so that the housing is rotatable relative to the base about the shaft;
a fastener detachably connecting the housing to the base; and
a reversible biasing element disposed within the housing and providing a torque to bias the housing relative to the base, wherein when the biasing element is disposed in a first orientation, the biasing element is operable to bias the housing in a clockwise direction relative to the base, and when the biasing element is reversed into a second orientation, the biasing element is operable to bias the housing in a counter-clockwise direction relative to the base.

18. The tensioner of claim 17 wherein the arm comprises a connector configured to detachably connect the arm to either the base or the housing.

19. The tensioner of claim 17 wherein the biasing element has a first end releasably connected with the housing and a second end releasably connected with the base.

* * * * *